Figure 1:
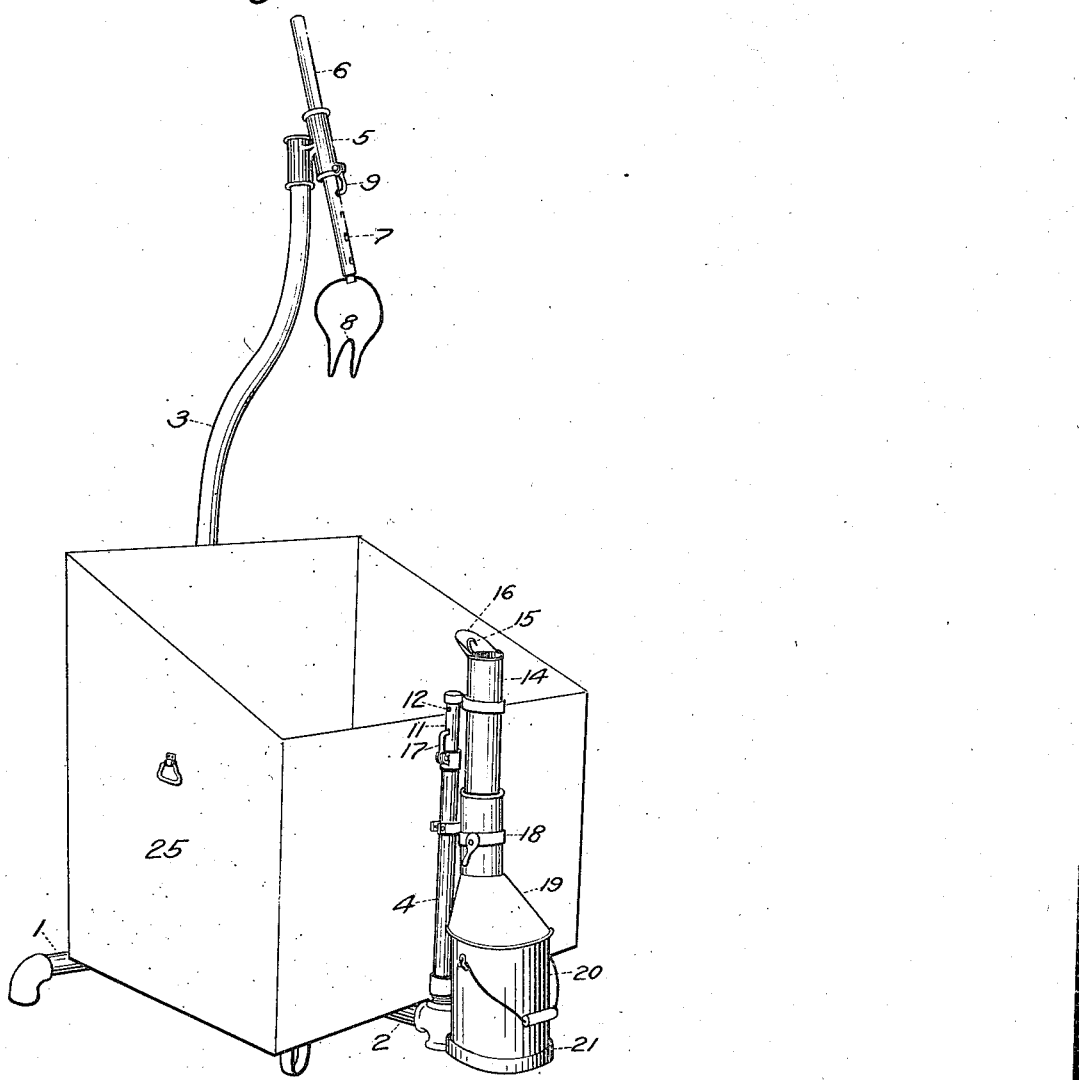

H. C. PIERCE.
POULTRY PICKING FRAME.
APPLICATION FILED AUG. 4, 1914.

1,155,004.

Patented Sept. 28, 1915.
2 SHEETS—SHEET 1.

Witnesses
Charles W. Boyle
John H. Roby

Inventor
Howard C. Pierce,
per Francis G. Caffey
Attorney

H. C. PIERCE.
POULTRY PICKING FRAME.
APPLICATION FILED AUG. 4, 1914.
1,155,004.
Patented Sept. 28, 1915.
2 SHEETS—SHEET 2.
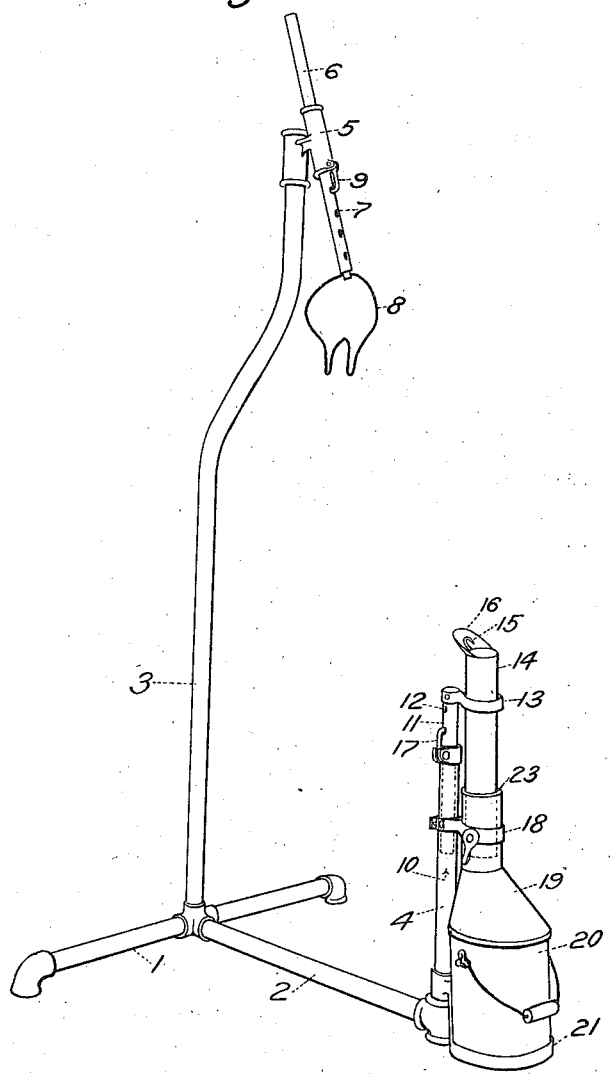
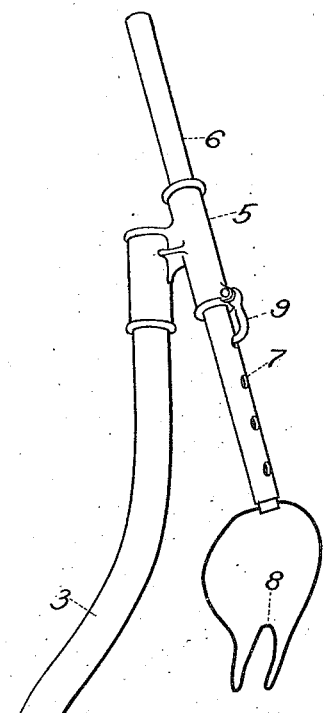
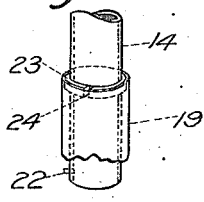
Witnesses
Charles W. Boyle
John H. Roby
Inventor
Howard C. Pierce
per Francis G. Caffey,
Attorney

UNITED STATES PATENT OFFICE.

HOWARD C. PIERCE, OF WORCESTER, MASSACHUSETTS.

POULTRY-PICKING FRAME.

1,155,004.　　　　　Specification of Letters Patent.　Patented Sept. 28, 1915.

Application filed August 4, 1914. Serial No. 855,064.

(DEDICATED TO THE PUBLIC.)

*To all whom it may concern:*

Be it known that I, HOWARD C. PIERCE, a citizen of the United States, and an employee of the Department of Agriculture of the United States of America, residing in the city of Worcester, State of Massachusetts, (whose post-office address is Worcester, Massachusetts,) have invented certain new and useful Improvements in Poultry-Picking Frames, of which the following is a specification.

This application is made under the act of March 3, 1883, Ch. 143 (22 Stat., 625), and the invention herein described and claimed may be used by the Government of the United States, or any of its officers or employees, in the prosecution of work for the United States, or by any person in the United States, without the payment of any royalty thereon.

The object of my invention is to provide a device which is inexpensive, simple in construction, and specially adapted for holding live fowl in a convenient position for killing, bleeding, and picking.

Further objects of my invention are to provide a device suitably equipped for saving the feathers removed from the birds after killing and for catching and saving the blood of the birds killed.

My invention is further designed to enable the operations involved in killing, bleeding, and picking birds to be performed with comparative ease and in a clean and sanitary manner, without danger of the body of the bird becoming soiled by contact with feathers or blood.

The nature, characteristic features and scope of my invention may be more readily understood from the following description taken in connection with accompanying drawings, forming a part hereof, wherein:

Figure 1 is a perspective view of my poultry picking frame in operative position; Fig. 2 is a perspective view of the same device with the receptacle for receiving the feathers removed; Fig. 3 is a perspective view of the upper poultry support or holder; Fig. 4 is a detail perspective view of funnel and tube.

Referring to the drawings, 1 represents a base strip or rod which may, if desired, be adjusted to the floor or a post in any suitable manner for holding the frame in a stable position. Intersecting said rod 1, approximate its center, and extending laterally therefrom is another base strip or rod 2, which said rod, together with rod 1, constitutes the base of the mechanism. The end of rod 2 may be secured to any fixed object for rendering said rod effectively stationary in conjunction with rod 1. Adjusted to rod 1, near its center, is an upright 3, and adjusted to the end of rod 2 is another upright, 4, which is shorter than upright 3. Said rods, 1 and 2, and said uprights, 3 and 4, form the frame of the apparatus. Secured to the upper end of upright 3 is a sleeve, 5, through which passes an adjustable handle or holder 6, provided with a series of recesses 7. Swiveled to the handle, 6, is a bifurcated hook, 8 for holding the fowl in position for killing and picking. Sleeve 5 is provided with a dog, 9, which is employed for regulating the adjustment of the handle, 6, by engaging recess 7.

Upright 4 is provided with a channel, 10, for receiving support, 11. Support 11 is provided with a series of recesses, 12, and is adapted to be moved upward or downward in said channel for adjustment. Secured to said support 11 is a collar 13, through which passes a tube, 14, bearing at its upper end a sharp hook, 15, fixedly adjusted in a shield, 16. When support 11 is elevated it carries upward with it tube 14 by means of the collar 13, and when said support 11 is lowered said tube 14 automatically descends with said support. Support 11 and tube 14 may be held at varying heights by means of the dog 17, fixed to upright 4, engaging recess 12 for locking said support. Upright 4 and tube 14 are so constructed that when said support and tube are elevated to their full height the upper end of said tube will be lower than the extended end of the handle 6. These parts are constructed in this way so that the bird to be dressed may be held by the device in a tilted position, in order that the bird may be completely bled. Holding the bird in a tilted position is attained by placing the legs of the fowl in the bifurcations of the hook 8 and fastening its head to hook 15 adjusted to tube 14. Secured to upright 4 is a second collar 18 which retains the inverted funnel 19 in a vertical position. The funnel 19 forms a cover for pail 20 resting in holder 21 secured to upright 4. The tube 14 is provided at its lower end with a stud 22 for engaging ring 23, secured to the interior of said funnel, when the tube, 14, is elevated, thereby providing means for preventing tube 14 from being pulled out of the funnel 19 during the adjustment of the mechanism. Ring 23 is provided with a slot 24, through which the stud, 22, may pass when tube 14 is placed in proper position, thus affording means by which tube 14 may be removed from the funnel 19 by the operator when necessary. Arranged between uprights 3 and 4 is a movable receptacle, 25, in which the feathers removed from the birds are dropped.

Any suitable material may be used in the construction of the apparatus herein described. All parts of the said device may be so constructed that they can be easily removed for cleaning or replacement. The mechanism may be made so that it can easily and conveniently be carried from place to place for use.

In practising my invention, I suspend the fowl from the hook, 8, by placing its feet in the bifurcations of said hook. When the bird is thus suspended, it is killed and cut through the mouth to allow bleeding. Immediately after killing and cutting, the mandible of the bird is fastened to hook 15, which action suspends the bird in a semi-vertical position by reason of the bifurcated hook, in which the legs of the bird are gripped, being adjusted at a point higher than hook 15. While in this position the bird is suspended above the receptacle 25 ready for picking. Its legs are kept separated and held firmly by the bifurcated hook, 8, and its head, hanging over shield 16, is held firmly by hook 15. By holding the bird rigidly in this manner, no blood is spattered on the feathers falling into receptacle 25 or on the bird, or on the operator, as the shield 16 prevents blood from falling outside of tube 14. The blood flows or drips from the wound in the mouth of the bird into tube 14, through which it passes into pail 20 where the blood is held until disposal. Upon removal from the bird the feathers are dropped into receptacle 25.

If the bird is unusually small, the handle 6 and the tube 14 may be extended to the desired position for holding the bird firmly in a slanting position above receptacle 25. Such object may be effected by disengaging dog, 9, from recess 7, in handle, 6, and permitting the handle or holder to slide through sleeve 5 until the handle, 6, is extended to the desired position. The handle, 6, is then locked by means of the dog, 9, engaging recess, 7. Support 11 is then elevated to the desired height, carrying with it tube 14. When support 11 is raised sufficiently, dog 17 is brought into play for engaging recess 12 for holding said support 11 in a locked position, thereby maintaining tube 14 at the desired height. On the other hand, if the bird to be killed and picked is of unusual length when extended, the holder and the tube, 14, may be adjusted so as to suspend the bird in a semi-vertical position over the receptacle 25 by unlocking the handle, 6, and sliding it backward through sleeve 5 until the desired position is obtained and then locking the handle in a fixed position by means of the dog 9. If it be necessary to lower tube 14, such action may be accomplished by unlocking dog 17 and permitting support 11 to slide downward in channel 10. As support 11 slides downward it carries with it tube 14. When support 11 has been lowered sufficiently, said support may then be held rigid by locking member 17, engaging recess 12. The device may be adjusted in the manner described to suit the variations in length of individual birds to be dressed.

Suspending the bird in the slanting position described causes the bird to be completely bled. It also enables the picker to handle the bird in a clean and sanitary manner as only the hands of the picker need touch the body of the bird. It further renders the picking operation to be easily and quickly performed for the reasons that all sides of the bird may be conveniently reached and the picker can use both hands in removing the feathers. It further renders the danger of bruising or scarring the bird, or tearing its skin, negligible. By means of my device all feathers removed from the birds may be saved, as well as the blood of the fowls, and devoted to such purposes for which they may be useful.

Having thus described my invention, I claim:

1. A poultry picking frame, comprising a base having uprights secured thereto, a sleeve adjusted to one of said uprights having an adjustable handle slidably arranged therein, said handle provided with a series of recesses and having a bifurcated hook suspended therefrom, and a dog adjusted to said sleeve for locking said handle, substantially as specified.

2. A poultry picking frame, comprising a base, uprights, one of which is channeled and provided with a dog, and a support, one of said uprights secured at one end of said base and the channeled upright secured at the other end, said last mentioned upright receiving in the channel a support provided with a series of recesses having secured thereto a collar, to which is movably adjusted a tube provided with a shield and a hook at its upper end, said dog adapted to engage said recesses for elevating and lowering said support in said channel, substantially as specified.

3. A poultry picking frame, comprising a base, having uprights secured thereto, a sleeve adjusted to one of said uprights having an adjustable handle slidably arranged therein, said handle provided with a series of recesses and having a bifurcated hook suspended therefrom, a dog adjusted to said sleeve for locking said handle, and means for supporting the head of the fowl in a fixed position, substantially as specified.

4. A poultry picking frame, comprising a base, uprights, one of which is channeled and provided with a dog, and a support, one of said uprights secured at one end of said base and the channeled upright secured at the other end, said last mentioned upright receiving in the channel the support provided with a series of recesses having secured thereto a collar, to which is movably adjusted a tube provided with a shield and a hook at its upper end, said dog adapted to engage said recesses for elevating and lowering said support in said channel, and means for supporting the feet of the fowl in a fixed position, substantially as specified.

5. The combination of a support, a receptacle, and means for suspending a fowl on the support in an inclined position, whereby when the fowl is lanced, its blood will drain into the receptacle.

6. The combination of a support, a receptacle and adjustable means for suspending a fowl on the support in an inclined position, whereby when the fowl is lanced its blood will drain into the receptacle.

7. The combination of a support, means for suspending a fowl at its extremities with its head downward, a receptacle, and a shield on said receptacle designed to direct the flow of blood to said receptacle when the fowl is slaughtered.

8. The combination of a support, adjustable means for suspending a fowl at its extremities with its head downward, a receptacle, and a shield on said receptacle designed to direct the flow of blood on said receptacle when the fowl is slaughtered.

9. The combination of a U-shaped support adapted to support a container for feathers, means for suspending a fowl at its extremities with its head downward, a receptacle, and a shield on said receptacle designed to direct the flow of blood to said receptacle when the fowl is slaughtered.

10. The combination of a U-shaped support, adjustable means for suspending a fowl at its extremities with its head downward, a receptacle, and a shield on said receptacle designed to direct the flow of blood on said receptacle when the fowl is slaughtered.

In testimony whereof, I affix my signature in the presence of subscribed witnesses.

HOWARD C. PIERCE.

Witnesses:
MILLIGAN C. KILPATRICK,
H. L. SHRADER.